| United States Patent [19] | [11] Patent Number: 4,762,700 |
| Huggins | [45] Date of Patent: Aug. 9, 1988 |

[54] AMMONIUM OCTAMOLYBDATE-ALPHA

[75] Inventor: Dale K. Huggins, Golden, Colo.

[73] Assignee: Amax Inc., Greenwich, Conn.

[21] Appl. No.: 48,352

[22] Filed: May 11, 1987

[51] Int. Cl.$^4$ .............................................. C01G 39/00
[52] U.S. Cl. ....................................................... 423/593
[58] Field of Search .......................................... 423/593

[56] References Cited

U.S. PATENT DOCUMENTS

| 1,838,767 | 12/1931 | Iredell | 423/593 |
| 3,848,049 | 11/1974 | Ronzio et al. | 423/593 |
| 3,899,284 | 8/1975 | Stanley | 423/593 |
| 3,963,823 | 6/1976 | Kulkarnl | 423/593 |
| 4,079,116 | 3/1978 | Ronzio et al. | 423/593 |
| 4,207,296 | 6/1980 | Nauta et al. | 423/593 |
| 4,382,069 | 5/1983 | Heytmeijer | 423/593 |
| 4,612,172 | 9/1986 | Brunelli et al. | 423/593 |

OTHER PUBLICATIONS

Ingvar Lindqvist, "On Tetramolybdates and Metatungstates", Acta Chem. Scand., vol. 4, (1950), pp. 551, 552.

*Primary Examiner*—John Doll
*Assistant Examiner*—Wayne A. Langel
*Attorney, Agent, or Firm*—Michael A. Ciomek; Eugene J. Kalil

[57] ABSTRACT

Ammonium octamolybdate-alpha is formed by reacting powdered molybdenum trioxide with a solution of ammonium dimolybdate in water at the boiling temperature until thickening of the slurry occurs, after which the slurry is digested, filtered hot and the separated precipitate is dried.

6 Claims, No Drawings

AMMONIUM OCTAMOLYBDATE-ALPHA

The present invention is directed to an improve process for making ammonium octamolybdate-alpha.

BACKGROUND OF THE INVENTION AND THE PRIOR ART

Ammonium octamolybdate, $(NH_4)_4Mo_8O_{26}$, exists in two isomeric solid forms, designated as alpha or beta forms. Ammonium octamolybdate-alpha, abbreviated AOM-α, is used in plastic formulations as a smoke suppressant and flame retardant. It is made commercially by the partial thermal decomposition of ammonium dimolybdate, $(NH_4)_2Mo_2O_7$, abbreviated ADM, according to the chemical equation:

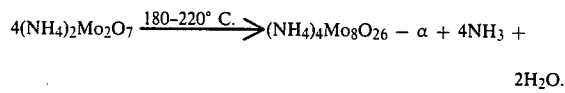

$$4(NH_4)_2Mo_2O_7 \xrightarrow{180-220° C.} (NH_4)_4Mo_8O_{26} - \alpha + 4NH_3 + 2H_2O.$$

However, the commercial process for making AOM-α by partial thermal decomposition of ADM has two serious disadvantages. The first disadvantage is that the AOM-α product has too large a particle size; therefore, the particle size must be reduced before it can be used in plastic formulations. The necessity for particle size reduction increases the cost of manufacturing the AOM-α by a significant amount. In addition, the particle size reduction frequently is not performed adequately, with the result that the AOM-α does not function properly in the plastic. This causes user dissatisfaction and loss of sales.

The second disadvantage of the present commercial process is the difficulty in controlling thermal decomposition. If the ADM starting material is not heated long enough or hot enough, underreaction will occur and ammonium trimolybdate $(NH_4)_2Mo_3O_{10}$, abbreviated ATM, will be produced. If the ADM starting material is heated too long or too hot, overreaction will occur and molybdic oxide, $MoO_3$, will be produced. Therefore, great difficulty is experienced in producing AOM-α which is not contaminated with significant amounts of ATM or $MoO_3$. In order to avoid underreaction or overreaction, a very uniform heating rate is required which is difficult to achieve when solid particulate material is being heated since conductivity is poor. In other words, the temperature must be the same everywhere and throughout the bulk of the solids at any given time. In addition, a very precise temperature and time control is required. In order to achieve the necessary heating control, thermal decomposition must be conducted on a small scale, resulting in a very labor-intensive process. In actual fact, the commercial process is conducted by heating the ADM in flat pans placed in a box oven with loading and emptying performed by hand.

The present invention overcomes the disadvantages of the commercial process described in the preceding paragraphs by producing a much finer AOM-α by a process which is much easier to control. Additionally, AOM-α with the desired purity and fine particle size can be achieved with less effort and with greater reliability.

SUMMARY OF THE INVENTION

The new process produces AOM-α by an aqueous procedure. Molybdic oxide is added to a solution of ammonium molybdate, such as a solution obtained by dissolving ADM $[(NH_4)_2Mo_2O_7]$ in water. The resulting slurry is heated while stirring, whereupon a thicker slurry composed of very fine particles of AOM-α is formed.

DETAILED DESCRIPTION OF THE INVENTION

In carrying the invention into practice, ammonium dimolybdate may be dissolved in water in amounts of about 50 to about 350 grams per liter. Molybdenum trioxide is added thereto as a fine powder having an average particle size of about 10 to about 300 microns (mu). The $MoO_3$ used should be of high purity, i.e., should contain no more than about 0.5% of impurities, such as Fe, K, Cu, Pb, Ca, etc.

When using ADM to form the ammonium molybdate solution used in the preparation, the proportions of ADM and $MoO_3$ required to form AOM-α are the stoichiometric proportions given by the equation:

$$2(NH_4)_2Mo_2O_7 + 4MoO_3 \rightarrow (NH_4)_4Mo_8O_{26}.$$

The ammonium molybdate solution may be formed from ammonium hydroxide and molybdic oxide, or from another source of ammonium molybdate such as ADM crystallizer mother liquor. In either event, the molar ratio $[NH_3]/[Mo]$ in the solution should be adjusted to a value of 1.00 prior to the addition of the solid $MoO_3$ in order to obtain an AOM product essentially free of other solid forms of ammonium molybdate such as AOM-β or ammonium heptomolybdate, etc.

The most reliable method of identifying and determining AOM-α is by means of its X-ray powder diffraction (XRD) pattern. Although quantitative analysis for Mo and $NH_3$ is helpful, it is not definitive, since AOM-β and casual mixtures of compounds produce quantitative analytical results for Mo and $NH_3$ which correspond to pure AOM-α. The X-ray powder diffraction pattern for AOM-60, using Cu Kα radiation, is summarized in the following table.

| X-Ray Powder Diffraction Data (Cu K) For AOM-α | | | | | |
|---|---|---|---|---|---|
| Degrees 2θ | d Å | I/Io | Degrees 2θ | d Å | I/Io |
| 9.80 | 9.03 | 50 | 33.35 | 2.687 | 5 |
| 12.40 | 7.14 | 100 | 33.60 | 2.667 | 10 |
|  |  | (1.5) | 34.00 | 2.637 | 5 |
| 16.25 | 5.45 | 10 | 35.00 | 2.564 | 20B |
| 18.30 | 4.85 | 40 | 36.50 | 2.362 | 15 |
| 21.05 | 4.22 | 5 | 37.75 | 2.383 | 40 |
| 22.10 | 4.02 | 25 | 39.10 | 2.304 | 5 |
| 23.80 | 3.74 | 10 | 41.20 | 2.191 | 5 |
| 24.90 | 3.58 | 70 | 42.20 | 2.141 | 10 |
| 26.05 | 3.42 | 40 | 42.40 | 2.132 | 10 |
| 26.50 | 3.36 | 15 | 43.00 | 2.103 | 20 |
| 27.10 | 3.29 | 40 | 42.40 | 2.132 | 10 |
| 28.00 | 3.19 | 15 | 43.00 | 2.103 | 20 |
| 28.30 | 3.15 | 20 | 45.90 | 1.977 | 5 |
| 29.20 | 3.05 | 25 | 46.60 | 1.949 | 5 |
| 29.50 | 3.03 | 35 | 47.90 | 1.899 | 10 |
| 30.40 | 2.940 | 80 | 48.30 | 1.884 | 10 |
| 32.20 | 2.780 | 5 | 48.80 | 1.866 | 20 |
| 32.55 | 2.751 | 5 | 50.00 | 1.824 | 15 |

An example will now be given.

To 200 ml of deionized water was added 59.0 gram of ADM to form a solution and 50 grams of pure molybdic oxide having a particle size of 50% >50 mu was added to form a slurry. The slurry was heated to 95° C., while stirring. Approximately 10 minutes after reaching 95°

C., the slurry thickened noticeably, which was assumed to indicate the formation of AOM-α. The slurry was digested for 3 hours at 95° C. The slurry was filtered hot, the filter cake was washed with one displacement wash of water and dried overnight at 110° C. XRD examination of the solids showed them to be AOM-α, with no other phases detectable. The particle size of the crushed solids, as determined by a Micromeritics Sedigraph (Model 5000D) was 50 percent <4.5 microns. Based on molybdenum analysis of the filtrate and solids, 99.1 percent of the starting molybdenum was recovered as AOM-α.

The fine ammonium octamolybdate powder produced in accordance with the invention has an average particle size not greater than about 6 microns, e.g., about 4.5 microns.

The present process, by using the aqueous route, avoids the difficulties of uneven heating associated with the thermal decomposition route and provides high yields of the desired product ammonium octamolybdate-alpha (AOM-α). In addition, there is no requirement for grinding the product as in the thermal decomposition route.

It is to be appreciated that there are many ammonium molybdates described in the published literature and there is conflicting information in the literature pertaining to such compounds. This fact necessitates the use of methods such as XRD to assure correct identification of the compounds. For reasons that are not well understood, AOM-α does not cause a blue color or tint in plastics to which it is added at the temperatures normally encountered in processing the plastic. Other molybdenum compounds, however, create a blue cast in the processed plastic, apparently due to decomposition of the compound during processing of the plastic. This factor requires that AOM-α to be used in plastics be as pure as possible.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

What is claimed is:

1. The method for producing fine ammonium octamolybdate-alpha which comprises adding fine molybdic oxide to ammonium molybdate dissoved in an aqueous medium, said molybdic oxide being added to said ammonium molybdate solution in substantially a stoichiometric amount to form a slurry, heating said slurry at substantially the boiling temperature sufficient to provide substantial thickening thereof and then digesting the thickened slurry, filtering and drying the resulting fine ammonium octamolybdate-alpha of high purity.

2. The method in accordance with claim 1, wherein said ammonium molybdate is in solution and said molybdic oxide being added to said ammonium molybdate solution in substantially a stoichiometric amount to form a slurry.

3. The method in accordance with claim 2, wherein said slurry is heated with stirring to about 95° C. for a time sufficient to provide substantial thickening thereof and then digesting the thickened slurry.

4. The method in accordance with claim 2, wherein said ammonium molybdate solution is prepared by reacting ammonium hydroxide and molybdic oxide and then adjusting the [$NH_3$]/Mo molar ratio to 1.00.

5. The method in accordance with claim 1, wherein said ammonium molybdate is present in said aqueous medium in the amount of about 50 to about 350 grams per liter, and molybdic oxide powder has a particle size of about 10 to about 300 microns.

6. The method in accordance with claim 1, wherein said ammonium octamolybdate-α product has an average particle size not greater than about 6 microns and contains no other phases detectable by XRD examination.

* * * * *